United States Patent
Sundborger et al.

(10) Patent No.: US 8,127,714 B2
(45) Date of Patent: Mar. 6, 2012

(54) METHOD AND ARRANGEMENT FOR ANIMAL MANAGEMENT

(75) Inventors: Helene Sundborger, Grödinge (SE); Martin Sjolund, Grödinge (SE); Krister Sjöblom, Ösmo (SE); Bengt-Ove Wigholm, Töreboda (SE); Mats Fellbrandt, Tibro (SE)

(73) Assignee: Delaval Holding AB, Tumba (SE)

( * ) Notice: Subject to any disclaimer, the term of this patent is extended or adjusted under 35 U.S.C. 154(b) by 579 days.

(21) Appl. No.: 12/087,078

(22) PCT Filed: Dec. 20, 2006

(86) PCT No.: PCT/SE2006/001455
§ 371 (c)(1),
(2), (4) Date: Jun. 5, 2009

(87) PCT Pub. No.: WO2007/078234
PCT Pub. Date: Jul. 12, 2007

(65) Prior Publication Data
US 2009/0301396 A1 Dec. 10, 2009

(30) Foreign Application Priority Data
Dec. 30, 2005 (SE) ........................................ 0502937

(51) Int. Cl.
*A01J 3/00* (2006.01)
*A01J 5/00* (2006.01)
(52) U.S. Cl. .................................. 119/14.02; 119/14.03

(58) Field of Classification Search ............... 119/14.02, 119/14.03
See application file for complete search history.

(56) References Cited

U.S. PATENT DOCUMENTS
5,782,199 A 7/1998 Oosterling
6,516,744 B1 2/2003 Bjork et al.

FOREIGN PATENT DOCUMENTS
EP 1 230 849 8/2002
WO WO 01/93666 12/2001
WO WO 03/086058 10/2003

*Primary Examiner* — Monica Williams
(74) *Attorney, Agent, or Firm* — Harness, Dickey & Pierce, P.L.C.

(57) ABSTRACT

A method for animal management is provided in a milking system including a a milking box, a milking apparatus for milking animals, an enclosed waiting area from which the animals are capable of entering the milking box, and a gate arrangement, in which each of the animals is allowed to enter and pass the waiting area if the animal, after having been identified, fulfills a criterion. The method includes measuring a time an animal waits in the waiting area before being milked; determining a ranking for the animal based on the time, the ranking being a measure of a hierarchic order of the animal among the animals milked in the milking system; and performing an action with regard to the milking system depending on the determined ranking.

27 Claims, 3 Drawing Sheets

METHOD AND ARRANGEMENT FOR ANIMAL MANAGEMENT

TECHNICAL FIELD OF THE INVENTION

Example embodiments relate to a method and an arrangement for animal management in a milking system.

DESCRIPTION OF RELATED ART AND BACKGROUND OF THE INVENTION

Such milking system is known from e.g. U.S. Pat. No. 5,782,199. Although such a system functions satisfactorily and takes over much time-consuming work from a farmer, in practice there appears to be a need for an improvement. With dairy animals it often appears that a dominant animal wishes to be the first to enter a milking box and that other dairy animals are pushed away by this dominant animal. By this behavior of the animals the milking system may be negatively influenced, which is not only undesirable for less dominant animals in terms of undesired increase of waiting time for these animals, but also for the efficiency of the milking system, for example when it comprises a milking robot.

EP 1230849 B1 acknowledges the problem in general even though this patent is primarily devoted to solutions for feeding stations and not milking boxes. With regard to milking boxes the patent states that the disadvantageous behavior is prevented at least for the greater part when in front of the entrance gate of the milking box there is provided a further area having at least one entrance gate for containing a limited number of animals. Further, in order not to prolong unnecessarily the waiting time for dairy animals to enter the milking box, the system may comprise a detection device for detecting animals in the further area and for issuing a detection signal, a detection signal indicating that animals are present in the further area keeping the entrance gate of the further area closed. As a detection device the animal identification system may be used. As a result thereof first all the animals present in the further area are given the opportunity to enter the milking box before new animals are admitted to the further area.

In an embodiment of the patent there is provided a hierarchic order determining means for determining data in relation to the hierarchic order, wherein the hierarchic order determining means stores the determined data in relation to the hierarchic order in a memory. Such a hierarchic order determining means may be constituted by the animal identification system, a camera or the like, possibly in combination with a computer. Due to this the system generates itself the data in relation to the hierarchic order. Preferably the data are updated in the memory.

SUMMARY OF THE INVENTION

While EP 1230849 B1 discloses different improvements and a hierarchic order determining means, it fails to disclose how to automatically obtain animal specific hierarchic order data.

Further, the solution with regard to a milking box as disclosed in EP 1230849 B1 seems to limit the throughput and the milk production of the milking system since the further area has to be emptied before new animals are admitted to the further area. Also, less dominant animals may be pushed away and may have to wait a considerable time before being milked, particularly if the number of animals in the further area is high.

It is therefore an object of the present invention to provide a method and an arrangement for animal management that remedies at least some of the problems associated with the prior art.

It is in this respect a particular object of the invention to provide such method and arrangement that provides an automatic determination of the hierarchic order of each of the animals served by the milking system.

It is a further object of the invention to provide such method and arrangement, which improve the efficiency of the milking system, and by which the animal treatment is improved.

It is still a further object of the invention to provide such method and arrangement, which are accurate, efficient, reliable, of reasonably low cost, and easy to implement.

These objects, among others, are attained by the methods and the arrangement as defined in the appended patent claims.

According to an aspect of the invention there is provided a method comprising the steps of measuring a time related to the time an animal waits in the waiting area before being milked (preferably the time from identification of the animal at the entry to the waiting area to identification of the animal in the milking box); determining a rank number for the animal based on the time related to the time the animal waits in the waiting area before being milked, where the rank number is a measure of the hierarchic order of the animal among the animals milked in the milking system; and performing an action with regard to the milking system depending on the determined rank number.

Various embodiments are disclosed in the dependent claims.

The action to be performed with regard to the milking system may be any kind of act or action that could be performed to improve the efficiency of the milking system or the animal care.

By means of the above-identified method an automatic manner of determining animal individual hierarchic order data is achieved. The method is advantageously implemented in an automated milking system.

According to a further aspect of the invention there is provided an arrangement for performing the above-identified method, wherein the arrangement comprises a clock for measuring the time, a processing device for determining the rank number, and a device for performing the action.

According to yet a further aspect of the invention there is provided a method comprising the steps of, when an animal is identified by the identification device at the entry of the waiting area, referring to a computer which holds or is provided to retrieve information as to (i) whether the animal has a low hierarchic order among the animals milked in the milking system, and (ii) whether the animal fulfills a milking criterion; and, if the animal fulfills the milking criterion and has a low hierarchic order, guiding the animal past the waiting area to the milking box in order to milk the animal before milking any animals waiting in the waiting area.

By means of the above-identified method there is provided an automatic manner of guiding the least dominant animals that fulfill the milking criterion past more dominant animals to the milking box, and the least dominant animals can therefore not be pushed away at the entry gate to the milking box.

According to still a further aspect of the invention there is provided an arrangement for performing the above-identified method, wherein the arrangement comprises a computer for holding or retrieving the milking permission and hierarchic order information, and a passage way for guiding the least dominant animals past the more dominant animals to the milking box.

According to yet a further aspect of the invention there is provided a method comprising the steps of, when an animal is identified by the identification device at the entry of the waiting area, referring to a computer which holds or is provided to retrieve information as to (i) whether the animal has a low hierarchic order among the animals milked in the milking system, and (ii) whether the animal fulfills a criterion; allowing the animal to enter the waiting area if the animal fulfills the criterion, and amending waiting area entering criteria for at least some animals that are subsequently identified by the identification device if the animal also has a low hierarchic order to thereby reduce competition with respect to the entry to the milking box in the waiting area.

By means of the above-identified method an automatic manner of reducing competition in the waiting area as soon as a less dominant animal has entered the waiting area is achieved.

According to still a further aspect of the invention there is provided an arrangement for performing the above-identified method, wherein the arrangement comprises a computer for holding or retrieving the criteria and hierarchic order information, and a gate arrangement for allowing the animal to enter the waiting area, wherein the computer is provided for amending the criteria for at least some animals that are subsequently identified by the identification device at the entry of the waiting area if the animal that has entered the waiting area is less dominant.

By the present invention it is possible to prevent that at milking boxes the behavior of certain animals is negatively influenced by e.g. dominant, jostling animals. The circulation of animals in the milking system is improved and so is the efficiency of the milk production. Since the invention also proposes a method and an arrangement for automatically establishing the hierarchic order of the animals in a group, the entire process may be fully automated.

Further characteristics of the invention and advantages thereof, will be evident from the detailed description of embodiments of the present invention given hereinafter and the accompanying FIGS. 1-5, which are given by way of illustration only and thus, are not limitative of the present invention.

In the following detailed description the animals are cows. However, the invention is not limited to cows, but is applicable to any animals having the capability of producing milk, such as sheep, goats, buffaloes, horses, etc.

DETAILED DESCRIPTION OF EMBODIMENTS

Figure 1:
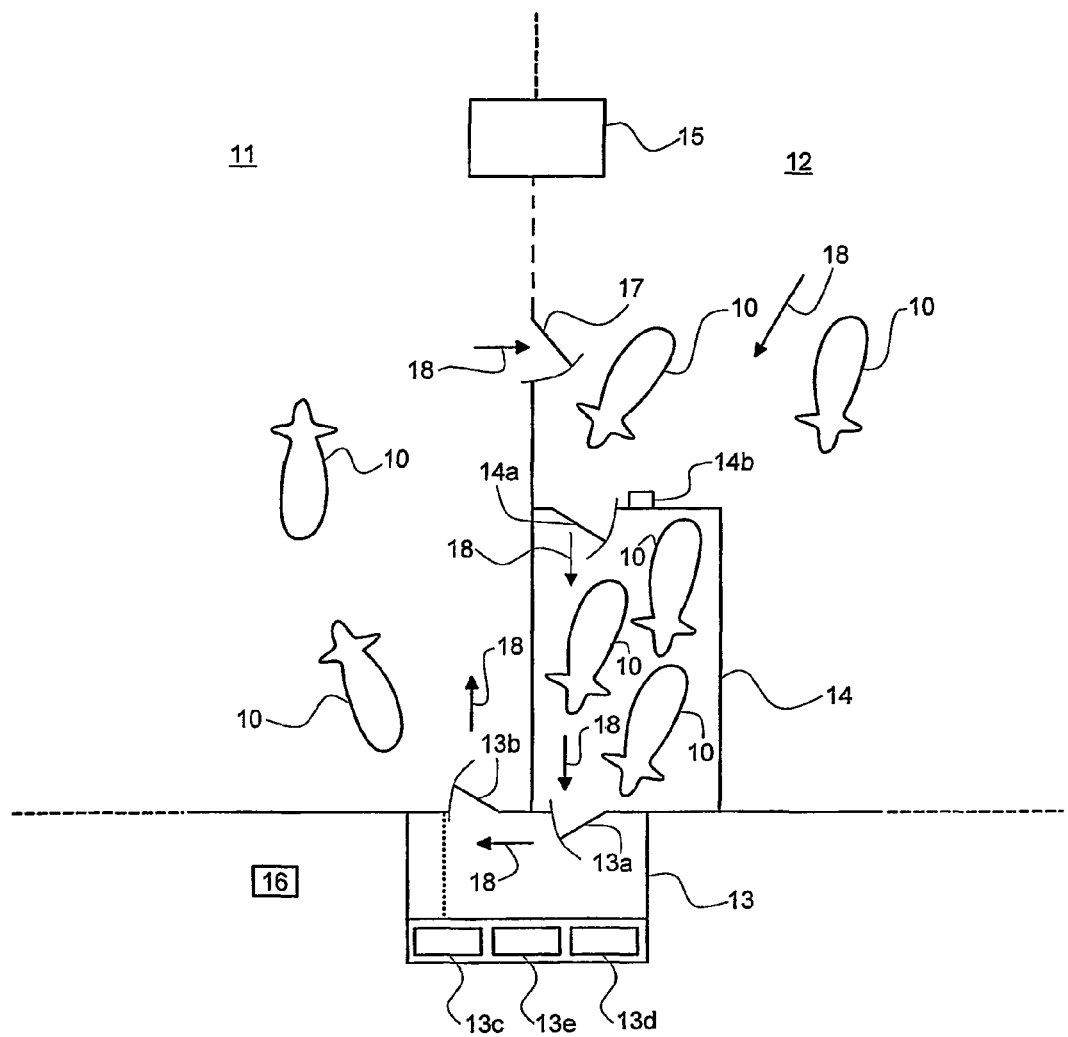
FIG. 1 illustrates schematically, in a top view, main components of a milking system, which comprises an arrangement for cow management according to an embodiment of the present invention.

FIG. 1 illustrates a milking system for housing a herd of cows 10 according to an embodiment of the invention. The milking system comprises two enclosed areas 11 and 12, which may be indoor areas, outdoor areas, or mixed indoor/outdoor areas. One of the two areas 11 and 12 may be a feeding area, and the other one of the two areas 11 and 12 may be a resting area.

The milking system, which is preferably an automated milking system, comprises a milking box 13 and an enclosed waiting area 14. The milking box 13 comprises an entry gate arrangement 13a, an exit gate arrangement 13b, a cow identification device 13c, a milking apparatus 13d, which may comprise a milking machine and a milking robot for application of teat cups of the milking machine to the teats of a cow present in the milking box 13, and a washing machine 13e for the cleaning of the milking apparatus and optionally of the teats of the cow present in the milking box 13.

The waiting area 14 comprises an entry gate arrangement 14a and a cow identification device 14b outside the entry gate arrangement 14a, and is accessible from one 12 of the two areas 11 and 12. From the waiting area 14 cows are capable of entering the milking box 13 via the entry gate arrangement 13a thereof.

A feed supply arrangement 15 is provided for supply of solid and/or liquid feed in either one of the two enclosed areas 11 and 12. The feed supply arrangement 15 may be provided with a cow identification device.

Further, the milking system comprises a process and control device 16 responsible for processing and/or controlling of the milking system including the opening and closing of the entry 13a, 14a and exit 13b gate arrangements, the operation of the milking apparatus 13d and the washing machine 13e, and the supply of feed by the feed supply arrangement 15. The process and control device 16 comprises typically a microcomputer, suitable software, and a database including information of each of the cows milked in the milking system, such as e.g. when the respective cow was milked last time, when the cow was fed last time, the milk production of the cow, the health of the cow, etc.

A one-way gate arrangement 17 is provided to allow for cows to move from the area 11 to the area 12, thus establishing a cow traffic pattern according the arrows 18 as shown in FIG. 1. Cows move from the area 11 to the area 12 through the one-way gate arrangement 17, and from the area 12 to the waiting area 14 through the entry gate arrangement 14a after having been identified by the identification device 14b and provided that they each fulfill a criterion, preferably a milking criterion. Further they enter the milking box 14 through the entry gate arrangement 13a, and they are identified by the identification device 13c and are milked by the milking apparatus 13d. After having been milked they are allowed to enter into the area 11 through the exit gate arrangement 13b and they are back where they started.

The area 11 may be a feeding area provided with the feed supply arrangement 15, and the area 12 may be a resting area provided with resting stalls (not illustrated). In such a milking system cows that are resting in the resting area 12 and become hungry are promoted to visit the milking box 13 and be milked therein as they have to pass the milking box 13 on their way to the feeding area 11.

Alternatively, the area 12 may be the feeding area provided with the feed supply arrangement 15, and the area 11 may be the resting area provided with resting stalls (not illustrated). In such a milking system cows that have been feeding in the feeding area 12 and become tired are promoted to visit the milking box 13 and be milked therein as they have to pass the milking box 13 on their way to the resting area 11.

In either case there may be several cows present in the waiting area 14 waiting to enter the milking box 13, and thus the problem with less dominant cows being pushed away by dominant cow(s), which is acknowledged in the prior art, occurs. The same problem exists with regard to other animal related stations or arrangements such as e.g. at the feed supply arrangement 15.

In order to remedy this problem the dominant and less dominant cows have to be identified and this could be performed manually by the farmer through visual inspection. However, such work is time consuming and thus costly. Further, in an automated system also the identification of the dominant and less dominant cows ought to be performed automatically.

The present invention thus proposes a method for cow management, which includes the automatic determination of the hierarchic order of each of the cows served by the milking system. In accordance with the method, which is illustrated in a flow scheme in FIG. 2, a time related to the time a cow waits in the waiting area 14 before being milked is, in a step 21, measured. Preferably, the time related to the time the cow waits in the waiting area 14 before being milked is measured as the time from identification of the cow by the identification device 14*b* at the entry of the waiting area 14 to the identification of the cow by the identification device 13*c* in the milking box 13.

Next, a rank number for the cow is, in a step 22, determined based on the above-identified measured time, where the rank number is a measure of the hierarchic order of the cow among the cows milked in the milking system. The rank number for the cow is advantageously determined so that a higher value of the measured time corresponds to a lower hierarchic order, and a lower value of the measured time corresponds to a higher hierarchic order. Finally, an action with regard to the milking system is, in a step 23, performed based on the determined rank number.

The steps are preferably performed for each cow that enters the waiting area 14.

The thus established rank numbers should give a good estimate of the hierarchic orders of the cows. It shall be appreciated that steps 21 and 22 may preferably be performed during an initial measurement period ranging from hours to days. A rank number may be determined for each cow each time the cow passes the waiting area 14, and a mean, median, variance or standard deviation value may preferably be calculated for each cow and used as the determined rank number in the step 23.

After the measuring period follows preferably an operation period, during which the above-identified action is performed.

Further, after an operation period, which may range from days or weeks to months or even years, a new measurement period is typically entered since some cows have been removed from the herd and others have been added. Also, in case the herd is unamended the hierarchic orders of the cows change with time since those of younger cows may typically rise, whereas those of older cows may fall.

Instead for the use of measurement and operation periods, an adaptive method for continuously adjusting the hierarchic orders during operation may be used.

Thus, the rank number for each cow may be determined based on a measure deduced from a number of last measured times the cow waits in the waiting area 14 before being milked (e.g. by using a sliding window covering the last week). The measure may be determined by low pass filtering a signal comprising the last measured times.

The action performed with regard to the milking system may, for each cow, comprise any or more of the following actions:

recording the rank number for the cow in the process and control device 16;

informing a farmer or user about the rank number of the cow;

informing a farmer about the rank number of the cow only if the rank number indicates that the cow has a low hierarchic order;

feeding the cow;

cleaning the milking system;

adjusting milking parameters for the milking of the cow;

adjusting, for the cow, the criterion for entering the waiting area 14; and adjusting, for at least some other of the cows, the criterion for entering the waiting area 14.

The information to the farmer may for instance be realized visually or by sound by means of suitable output device such as a display unit or a loudspeaker.

The term low hierarchic order as used in the present text is intended to refer to a range encompassing a given number of cows or a given percentage of cows that have the lowest hierarchic orders (i.e. the least dominant cows) among the cows milked in the milking system.

If a cow having a low hierarchic order is identified at the feed supply arrangement 15 the supply of feed may be performed faster, and if a dominant cow is identified at the feed supply arrangement 15 shortly thereafter, she may have pushed away the less dominant cow, and as a result no or only limited feed may be supplied to the less dominant cow. The actions as described in the above cited EP 1230849 B1 may e.g. be performed, the contents of which patent being hereby incorporated by reference.

The cleaning of the milking apparatus, which may be performed typically a few times a day, may be delayed if a cow having a low hierarchic order is present in the waiting area 14 since such a cow has to wait a considerable time without having to wait for the cleaning of the milking apparatus. On the other hand, if no such cows are present in the waiting area 14 the milking box may be closed and the milking apparatus may be cleaned while the cows in the waiting area 14 are waiting.

Milking parameters, such as e.g. milking and pulsation vacuum levels, for the milking of a cow having a low hierarchic order may be adjusted, e.g. lowered, in order to treat such a cow more gentle and cautious. Similarly, the cleaning of the teats of such a cow may be adjusted, e.g. made more gentle and cautious, to not stress the cow, which may have suffered from being dominated and pushed away by other cows.

The criterion for entering the waiting area 14 may be adjusted, e.g. made more relaxed, for a cow having a low hierarchic order in order to allow the cow to enter the waiting area 14 if it almost fulfills a milking criterion. This may be advantageous since such a cow has typically to wait a longer time before being capable or allowed to enter the milking box 13. Similarly, the criteria for entering the waiting area 14 for the more dominant cows may be sharpened (if a cow having a low hierarchic order is present in the waiting area 14) in order to reduce competition with regard to the entry to the milking box 13.

By the above provisions the stress that less dominant cows may experience is reduced.

Other actions to be performed with regard to the milking system are described further below with reference to FIGS. 4 and 5.

Figure 2:
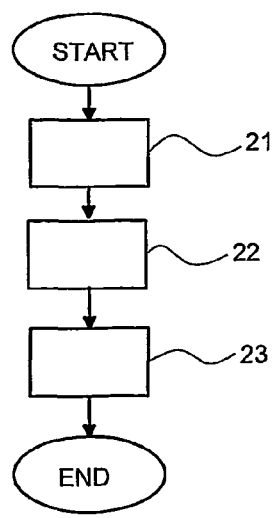
FIG. 2 is a flow scheme of a method for cow management implemented in the milking system of FIG. 1.

An arrangement for performing the method as described with reference to FIG. 2 may comprise the process and control device 16 for performing the steps 21 and 22 and any of the process and control device 16, the entry 13*a*, 14*a*, and exit 13b gate arrangements, the milking apparatus 13d, the washing machine 13e, or the feed supply arrangement 15 depending on the action to be performed. It shall, however, be appreciated that the method may be implemented in another device than the process and control device 16, such as in a separate computer or other apparatus.

Figure 3:
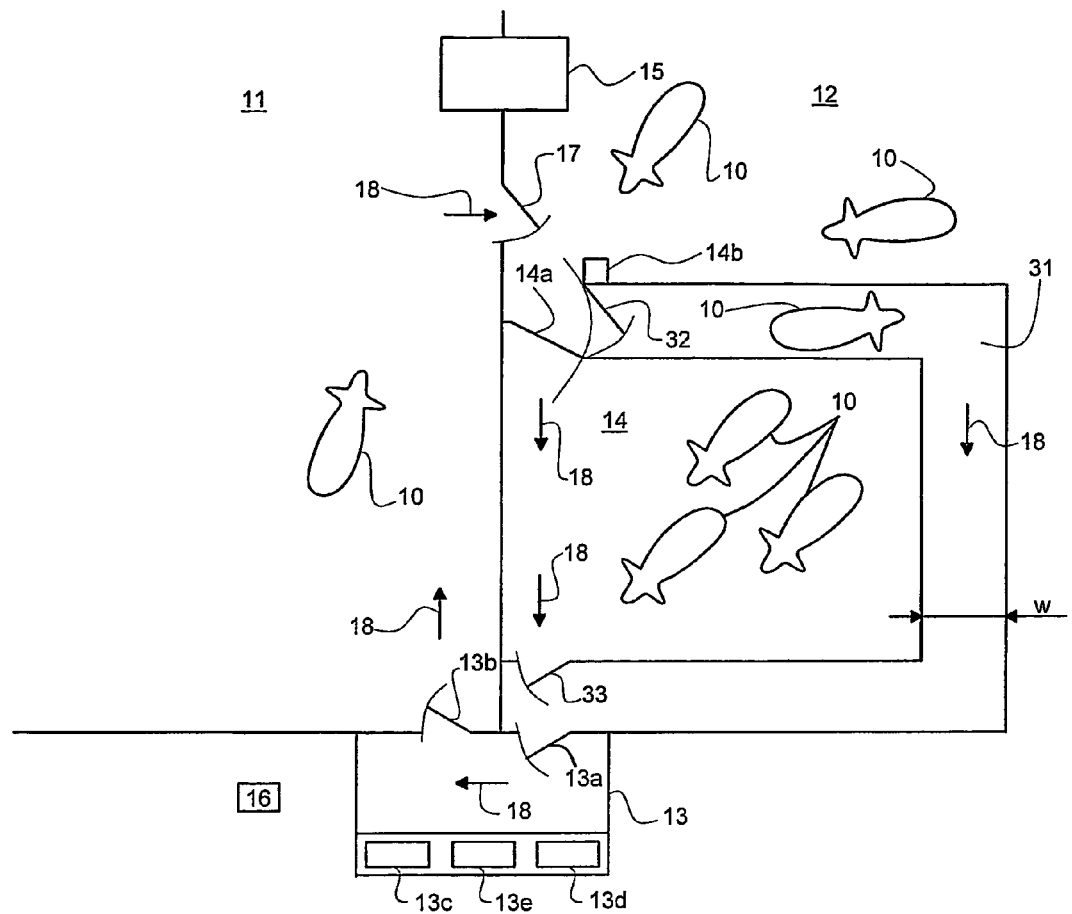
FIG. 3 illustrates schematically, in a top view, main components of a milking system, which comprises an arrangement for cow management according to a further embodiment of the invention.

With reference next to FIG. 3, which illustrates another milking system for housing a herd of cows 10, a further embodiment of the invention is described. The milking system of FIG. 3 differs from the milking system of FIG. 1 in that it comprises a passage way 31 leading from the entry gate arrangement 14a of the waiting area 14 to the entry gate arrangement 13a of the milking box 13. The passage way 31 is provided with an entry gate arrangement 31a and an exit gate arrangement 31b, the opening and closing of which may be performed under the control of the process and control device 16.

The entry gate arrangements 14a and 31a of the waiting area 14 and the passage way 31 may be operated together to selectively allow a cow to enter either the waiting area 14 or the passage way 31. Similarly, the entry gate arrangement 13a of the milking box 13 and the exit gate arrangement 31b of the passage way 31 may be operated together to selectively allow either a cow from the waiting area 14 or from the passage way 31 to enter the milking box 13. Preferably, the passage way 31 has a width w small enough to prevent cows from passing each other therein.

Figure 4:
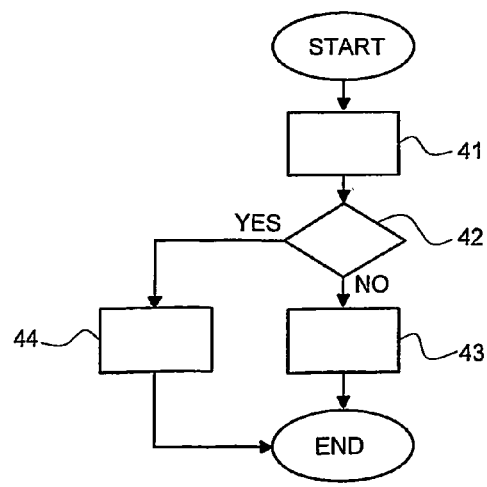
FIG. 4 is a flow scheme of a method for cow management implemented in the milking system of FIG. 3.
Figure 5:
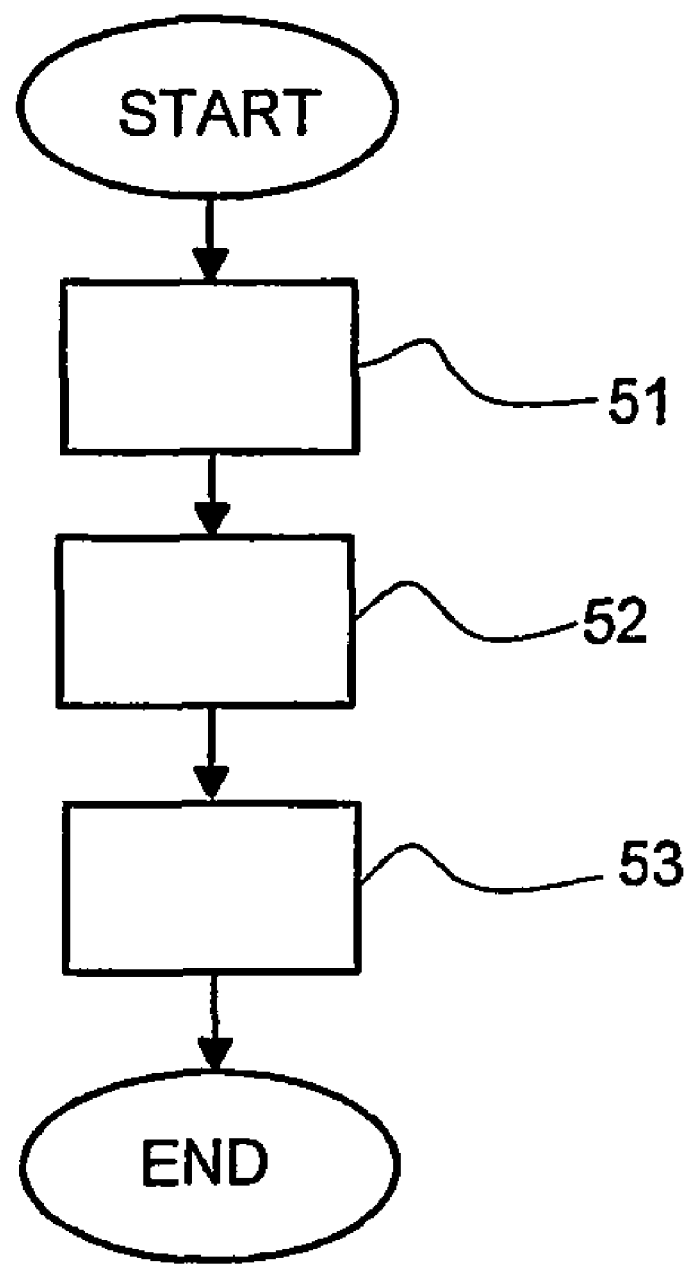
FIG. 5 is a flow scheme of a method for cow management according to still a further embodiment of the invention.

In order to remedy the problem with dominant cows pushing away less dominant cows from the entry gate arrangement 13a of the milking box 13 in the waiting area, a method for cow management is provided which is illustrated in a flow scheme in FIG. 4.

In accordance with the method, when a cow is identified by the identification device 14b at the entry gate arrangement 14a of the waiting area 14, reference is, in a step 41, made to computer, e.g. the process and control device 16, which to this end holds or is provided to retrieve information as to (i) whether the cow has a low hierarchic order among the cows milked in the milking system, and (ii) whether the cow fulfills a milking criterion, i.e. has permission to be milked. The low hierarchic order is defined as above. A cow may have a low hierarchic order if it belongs to e.g. the 10% of the cows in the herd that have the lowest hierarchic orders.

Next, it is, in a step 42, checked if the cow fulfills the milking criterion and if the cow has a low hierarchic order. If the cow fulfills the milking criterion, but has not a low hierarchic order, the cow is, in a step 43, allowed to enter the waiting area 14 by appropriate operation of the entry gate arrangements 14a and 31a of the waiting area 14 and the passage way 31. If the cow fulfills the milking criterion, and has a low hierarchic order, the cow is, in a step 44, allowed to enter the passage way 31 by appropriate operation of the entry gate arrangements 14a and 31a of the waiting area 14 and the passage way 31, and is guided past the waiting area 14 and any cows waiting therein to the milking box 13 in order to milk the cow before milking any cows waiting in the waiting area 14. If the cow does not fulfill the milking criterion it is not allowed to enter the waiting area 14 or the passage way 31.

By means of this method a less dominant cow can be led through the passage way to the milking box and be milked before the more dominant cows waiting in the waiting area 14. Such a "VIP lane" for the less dominant cow reduces its waiting time considerably, and it has not to struggle with the more dominant cows to get access to the milking box. A more efficient milking system with improved animal care is achieved.

The information as to whether the cow has a low hierarchic order among the cows milked in the milking system may be retrieved automatically during a measurement period preceding the method for cow management as being illustrated in FIG. 4. For instance, the information may be retrieved by the method as described with reference to FIG. 2, or it may be determined based on a time lapsed between two consecutive milkings of the cow, where a longer time corresponds to a lower hierarchic order and a shorter time corresponds to a higher hierarchic order.

Alternatively, the information as to whether the cow has a low hierarchic order among the cows milked in the milking system may be based on a variance of the time lapsed between two consecutive milkings of the cow (as measured a plurality of times) or may be based on the variance of the time related to the time the cow waits in the waiting area 14 before being milked (as measured a plurality of times).

Still alternatively, the information as to whether the cow has a low hierarchic order among the cows milked in the milking system may be determined by the farmer, e.g. through visual inspection, and the information may be entered manually by the farmer.

Yet alternatively, any of the above automatic methods may be used, wherein the method is supplemented by the option for the farmer to manually adjust or modify the automatically determined value.

An arrangement for performing the method as described with reference to FIG. 4 may comprise a computer for performing the step 41 and the computer, the entry 14a, 31a, 13a and exit 31b gate arrangements, and the passage way 31 for performing the steps 43 and 44.

A method for cow management provided as an alternative to the method described with reference to FIG. 4 is illustrated in a flow scheme in FIG. 5. In accordance with this method, when a cow is identified by the identification device 14b at the entry gate arrangement 14a of the waiting area 14 reference is, in a step 51, made to a computer such as the process and control device 16 which holds or is provided to retrieve information as to (i) whether the cow has a low hierarchical order among the cows milked in the milking system, and (ii) whether the cow fulfills a criterion. If the cow fulfills the criterion the cow is, in a step 52, allowed to enter the waiting area 14 by opening of the entry gate 14a, and if the cow also has a low hierarchical order, waiting area entering criteria for at least some cows, preferably cows having high hierarchic orders among the cows, that are subsequently identified by the identification device 14b at the entry gate arrangement 14a of the waiting area 14 are, in a step 53, amended, i.e. sharpened, to thereby reduce competition with respect to the entry to the milking box 13 in the waiting area 14. That is, fewer dominant cows that may push away or stress a less dominant cow will be present in the waiting area 14. The animal care is improved and so is the efficiency of the milk production.

The term high hierarchic order as used in the present text is intended to refer to a range encompassing a given number of cows or a given percentage of cows that have the highest hierarchic orders (i.e. the most dominant cows) among the cows milked in the milking system.

Preferably, the criteria for all cows that are subsequently identified by the identification device 14b are amended if a cow having a low hierarchical order among the cows milked in the milking system is present in the waiting area 14. The criteria for the cows that are subsequently identified may be sharpened so much that no cow is allowed to enter the waiting area 14 until all cows with low hierarchical orders present in the waiting area 14 have entered the milking box 13.

The criteria for the cows, which were amended, may be amended once again to their previous settings when all cows with low hierarchical orders present in the waiting area 14 have entered the milking box 13.

The information as to whether the cow has a low hierarchic order among the cows milked in the milking system may be determined similarly as being described with regard to the method illustrated in FIG. 4.

An arrangement for performing the method as described with reference to FIG. 5 may comprise a computer for performing the step 51 and the computer and the entry gate arrangement 14*a* for performing the steps 52 and 53.

The methods as described with reference to FIGS. 4 and 5 may be combined so that the cows with the lowest hierarchic orders are guided through the passage way 31 in accordance with the method described with reference to FIG. 4, whereas the entry of a cow (with milking permission) among the cows with the next lowest hierarchic orders into the waiting area 14 triggers the amendment of the waiting area entering criteria for at least some cows that are subsequently identified at the entry to the waiting area 14 in accordance with the method described with reference to FIG. 5.

The methods may be supplemented by the option to always allow a cow to enter the waiting area 14 and/or the passage way 31 provided that the cow has not been milked during a given period of time, e.g. 14 hours.

It shall be appreciated that the present invention may be implemented in other milking systems than those described in the present description. The requirements on the milking system are specified in the respective appended claim.

Similarly, alternative gate arrangements and pre-selection gates that have an equivalent function as those described above may be used with the present invention.

The invention claimed is:

1. A method for animal management in a milking system which includes a milking box provided with a milking apparatus for milking animals, an enclosed waiting area from which the animals are capable of entering the milking box, and a gate arrangement provided with an animal identification device, in which each of the animals is allowed to enter and pass said waiting area if the animal, after having been identified, fulfills a criterion, said method comprising:

measuring a time related to a time an animal waits in said waiting area before being milked;

determining a ranking for said animal based on said time related to the time said animal waits in said waiting area before being milked, said ranking being a measure of a hierarchic order of the animal among the animals milked in the milking system; and performing an action with regard to said milking system depending on said determined ranking, wherein the ranking of said animal is determined so that a higher value of said time related to the time the animal waits in said waiting area before being milked corresponds to a lower hierarchic order, and a lower value of said time related to the time the animal waits in said waiting area before being milked corresponds to a higher hierarchic order.

2. The method of claim 1, wherein said time related to the time the animal waits in said waiting area before being milked is measured as the time from identification of the animal by the identification device to an identification of the animal in the milking box.

3. The method of claim 1, wherein the time related to the time the animal waits in said waiting area before being milked is measured repeatedly; and the ranking of said animal is determined based on a measurement deduced from said repeatedly measured time related to the time the animal waits in said waiting area before being milked.

4. The method of claim 1, wherein said action includes recording the ranking of said animal in a computer.

5. The method of claim 1, wherein said action includes informing a user of the milking system about the ranking of said animal.

6. The method of claim 5, wherein said action informing the user of the milking system about the ranking of said animal is performed only if the ranking indicates that the animal has a low hierarchic order.

7. The method of claim 1, wherein said action comprises feeding said animal.

8. The method of claim 1, wherein said action comprises cleaning said milking system.

9. The method of claim 1, wherein said action comprises adjusting milking parameters for the milking of said animal.

10. The method of claim 1, wherein said action comprises adjusting, for said animal, the criterion for entering said waiting area.

11. The method of claim 1, wherein said action comprises adjusting, for at least some other animals, the criterion for entering said waiting area.

12. The method of claim 1, wherein said action comprises:

when said animal is subsequently identified by the identification device, guiding said animal past said waiting area to said milking box in order to milk the animal before milking any animals waiting in said waiting area.

13. The method of claim 1, wherein said action comprises:

when said animal is subsequently identified by the identification device and allowed to enter said waiting area, amending the criteria for at least some animals that are identified by the identification device when said animal is present in said waiting area so as to reduce competition of said animals entering said milking box in said waiting area.

14. An arrangement for animal management in a milking system which includes a milking box provided with a milking apparatus for milking animals, an enclosed waiting area from which the animals are capable of entering the milking box, and a gate arrangement provided with an animal identification device, in which each of the animals is allowed to enter and pass said waiting area if the animal, after having been identified, fulfills a criterion, said arrangement comprising:

a clock device provided for measuring a time related to a time an animal waits in said waiting area before being milked;

a processing device provided for determining a ranking for said animal based on said time related to the time the animal waits in said waiting area before being milked, said ranking being a measure of a hierarchic order of the animal among the animals milked in the milking system; and a device provided for performing an action with regard to said milking system depending on said determined ranking, wherein the ranking of said animal is determined so that a higher value of said time related to the time the animal waits in said waiting area before being milked corresponds to a lower hierarchic order, and a lower value of said time related to the time the animal waits in said waiting area before being milked corresponds to a higher hierarchic order.

15. An arrangement for animal management in a milking system which includes a milking box provided with a milking apparatus for milking animals, an enclosed waiting area from which the animals are capable of entering the milking box, and a gate arrangement provided with an animal identification device, in which each of the animals is allowed to enter and pass said waiting area if the animal, after having been identified, fulfills a criterion, said arrangement comprising:

a clock device provided for measuring a time related to a time an animal waits in said waiting area before being milked;

a processing device provided for determining a ranking for said animal based on said time related to the time the animal waits in said waiting area before being milked, said ranking being a measure of a hierarchic order of the animal among the animals milked in the milking system; and a device provided for performing an action with regard to said milking system depending on said determined ranking, wherein said device provided for performing the action with regard to said milking system includes said gate arrangement, and said gate arrangement is provided for adjusting, for said animal or for at least some other animals, the criterion for entering said waiting area.

16. A method for animal management in a milking system which includes a milking box provided with a milking apparatus for milking animals, an enclosed waiting area from which the animals are capable of entering the milking box, and a gate arrangement provided with an animal identification device, in which each of the animals is allowed to enter and pass said waiting area if the animal, after having been identified, fulfills a milking criterion, said method omprising:

when an animal is identified by the identification device, corresponding to a computer which holds or is provided to retrieve information, determining whether said animal has a low hierarchic order among the animals milked in the milking system, and whether said animal fulfills a milking criterion;

allowing said animal to enter said waiting area if the animal fulfills the milking criterion but not a low hierarchic order; and guiding the animal past said waiting area to said milking box in order to milk the animal before milking any animals waiting in said waiting area if the animal fulfills the milking criterion and has a low hierarchic order, wherein guiding of the animal past said waiting area to said milking box is performed in a passage way, which is narrow to prevent animals from passing each other therein.

17. The method of claim 16, wherein said low hierarchic order among the animals milked in the milking system is given as a range encompassing a given number of animals or a given percentage of animals that have the lowest hierarchic order among the animals milked in the milking system.

18. The method of claim 16, wherein said information as to whether said animal has a low hierarchic order among the animals milked in the milking system is based on a time lapsed between two consecutive milkings of said animal or based on a time related to the time said animal waits in said waiting area before being milked.

19. An arrangement for animal management in a milking system which includes a milking box provided with a milking apparatus for milking animals, an enclosed waiting area from which the animals are capable of entering the milking box, and a gate arrangement provided with an animal identification device, in which each of the animals is allowed to enter and pass said waiting area if the animal, after having been identified, fulfills a milking criterion, said arrangement comprising:

a computer, when an animal is identified by the identification device, configured to hold or retrieve information so as to determine whether said animal has a low hierarchic order among the animals milked in the milking system, and whether said animal fulfills a milking criterion; and a passage way provided with a gate arrangement to guide the animal past said waiting area to said milking box in order to milk the animal before milking any animals waiting in said waiting area if the animal fulfills the milking criterion and has a low hierarchic order, wherein said passage way is narrow to prevent animals from passing each other therein.

20. A method for animal management in a milking system which includes a milking box provided with a milking apparatus for milking animals, an enclosed waiting area from which the animals are capable of entering the milking box, and a gate arrangement provided with an animal identification device, in which each of the animals is allowed to enter and pass said waiting area if the animal, after having been identified, fulfills a waiting area entering criterion, said method comprising:

when an animal is identified by the identification device, corresponding to a computer which holds or is provided to retrieve information, determining whether said animal has a low hierarchic order among the animals milked in the milking system, and whether said animal fulfills a waiting area entering criterion; and if the animal fulfills the waiting area entering criterion, allowing said animal to enter said waiting area, and if the animal also has a low hierarchic order, amending the waiting area entering criteria for at least some animals that are subsequently identified by the identification device so as to reduce competition of said animals entering said milking box in said waiting area.

21. The method of claim 20, wherein said low hierarchic order among the animals milked in the milking system is given as a range encompassing a given number of animals or a given percentage of animals that have the lowest hierarchic order among the animals milked in the milking system.

22. The method of claim 20, wherein the waiting area entering criteria for all animals that are subsequently identified by the identification device are amended if the animal has a low hierarchic order among the animals milked in the milking system.

23. The method of claim 22, wherein the waiting area entering criteria for all animals that are amended if the animal has a low hierarchic order among the animals milked in the milking system are amended so that no animal is allowed to enter said waiting area until the animal having a low hierarchic order has entered said milking box.

24. The method of claim 20, wherein the waiting area entering criteria for at least some animals, which are amended if the animal has a low hierarchic order, are amended back to their previous settings when the animal having a low hierarchic order has entered said milking box.

25. The method of claim 20, wherein the waiting area entering criteria for at least some animals, which are amended if the animal has a low hierarchic order, are amended so that the waiting area entering criteria for animals having high hierarchic orders are sharpened.

26. An arrangement for animal management in a milking system which includes a milking box provided with a milking apparatus for milking animals, an enclosed waiting area from which the animals are capable of entering the milking box, and a gate arrangement provided with an animal identification device, in which each of the animals is allowed to enter and pass said waiting area if the animal, after having been identified, fulfills a waiting area entering criterion, said arrangement comprising:

means, when an animal is identified by the identification device, for holding or retrieving information to determine whether said animal has a low hierarchic order among the animals milked in the milking system, and whether said animal fulfills a waiting area entering criterion; and means, if the animal fulfills the waiting area entering criterion, for allowing said animal to enter said waiting area and, if the animal also has a low hierarchic order, amending the waiting area entering criteria for at least some animals that are subsequently identified by the identification device so as to reduce competition of said animals entering said milking box in said waiting area.

27. The arrangement of claim 26, wherein said means for amending is arranged for amending the waiting area entering criteria for all of the animals that are subsequently identified by the identification device if the animal has a low hierarchic order among the animals milked in the milking system.

* * * * *